(12) United States Patent
Rasekhi (10) Patent No.: US 10,106,069 B2
(45) Date of Patent: Oct. 23, 2018

(54) RETRACTABLE STEP HAVING A LIFTING AND RAMP FUNCTION

(71) Applicant: GEBR. BODE GMBH & CO. KG, Kassel (DE)

(72) Inventor: Abbas Rasekhi, Kassel (DE)

(73) Assignee: GEBR. BODE GMBH & CO. KG, Kassel (DE)

( * ) Notice: Subject to any disclaimer, the term of this patent is extended or adjusted under 35 U.S.C. 154(b) by 0 days.

(21) Appl. No.: 15/529,917

(22) PCT Filed: Nov. 27, 2015

(86) PCT No.: PCT/EP2015/077945
§ 371 (c)(1),
(2) Date: May 25, 2017

(87) PCT Pub. No.: WO2016/083586
PCT Pub. Date: Jun. 2, 2016

(65) Prior Publication Data
US 2017/0327022 A1 Nov. 16, 2017

(30) Foreign Application Priority Data
Nov. 28, 2014 (DE) .................. 20 2014 105 766 U (51) Int. Cl.
*B60P 1/43* (2006.01)
*E01D 15/00* (2006.01)
*B61D 23/00* (2006.01)
*A61G 3/06* (2006.01)

(52) U.S. Cl.
CPC .............. *B60P 1/436* (2013.01); *E01D 15/00* (2013.01); *A61G 3/061* (2013.01); *B61D 23/00* (2013.01)

(58) Field of Classification Search
CPC .. B60P 1/43; B60P 1/431; B60P 1/433; B60P 1/436; B60P 3/02; A61G 3/061
USPC ........................... 14/71.3; 187/200; 414/921
See application file for complete search history.

(56) References Cited

U.S. PATENT DOCUMENTS

| | | | |
|---|---|---|---|
| 5,160,236 A * | 11/1992 | Redding ............... | A61G 3/061 14/71.1 |
| 5,636,399 A * | 6/1997 | Tremblay ............... | A61G 3/061 14/71.1 |
| 5,832,555 A * | 11/1998 | Saucier .................. | A61G 3/061 14/71.1 |
| 6,238,168 B1 * | 5/2001 | Cohn ..................... | A61G 3/061 414/537 |
| 6,470,523 B1 * | 10/2002 | Sardonico ............. | A61G 3/061 14/69.5 |

(Continued)

FOREIGN PATENT DOCUMENTS

DE 202010000524 U1 4/2011

OTHER PUBLICATIONS

International Search Report dated Feb. 2, 2016 re: Application No. PCT/EP2015/077945; pp. 1-2; citing: DE 20 2010 000524 U1.

*Primary Examiner* — Gary S Hartmann
(74) *Attorney, Agent, or Firm* — Cantor Colburn LLP (57) ABSTRACT

A boarding system for a vehicle for transporting people includes a retractable step that has a lifting function and a ramp function. An extendable front edge of the retractable step and a rear edge of the retractable step are arranged behind in the direction of travel and are adjustable in terms of height.

10 Claims, 9 Drawing Sheets

(56) References Cited

U.S. PATENT DOCUMENTS 8,534,979 B2 * 9/2013 Hansen .................. A61G 3/061
                                                      414/537
9,168,190 B2 * 10/2015 Rasekhi .................... B60R 3/02

* cited by examiner

RETRACTABLE STEP HAVING A LIFTING AND RAMP FUNCTION

TECHNICAL FIELD

The disclosure relates to a boarding system for a passenger transport vehicle comprising a retractable step having a lifting and ramp function.

BACKGROUND

Retractable steps are used in boarding systems for passenger transport vehicles, to make it easier for persons to board and exit. Such retractable steps are also identified as extensions or kick plates. Boarding systems have an extendable retractable step comprising a loadable and walkable tread. The retractable step can thereby be arranged in a frame as accommodating device for the step, which is fixedly connected to the vehicle. For example, the retractable step can thereby be inserted into the frame and can be fastened to the frame for extending the retractable step.

On principle, there are many approaches for designing such boarding systems comprising retractable steps for boarding passenger transport vehicles. It is problematic, however, that tolerances with regard to a distance to the vehicle are at hand due to different boarding platforms, such as, for example train or bus platforms. Known boarding systems can ensure a barrier-free boarding of a vehicle, when a retractable step compensates a distance between the vehicle and a boarding platform, in that the retractable step is extended so that persons can board. However, it is problematic that boarding platforms are designed differently with regard to the distance to the vehicle entrance as well as with regard to the height to the vehicle entrance. This is also why it is necessary for the height of the boarding platform to be compensated with regard to the entrance to the vehicle by means of a boarding aid. This need exists in particular for barrier-free passenger transport entrances.

SUMMARY

The disclosure thus provides a boarding system, which bridges a distance between a boarding platform and a vehicle entrance in an improved manner. The disclosure further provides that the access to a vehicle can be ensured in a barrier-free manner.

This is solved by providing a boarding system comprising a retractable step having a lifting and ramp function, wherein an extendable front edge of the retractable step and a rear edge of the retractable step which is arranged in the rear in the direction of travel, are adjustable in terms of height; an extending device for retracting and extending the retractable step, wherein the extending drive has an extending motor and a lifting gear, wherein the lifting gear translates an extending movement of the extending motor into an at least partial pivoting movement of the retractable step, so that the pivoting movement of the retractable step causes a change of height of the front edge and/or of the rear edge; and an extending unit, with which the retractable step is movably coupled via the lifting gear, wherein, the lifting gear has a first lifting element and a second lifting element, which has a substantially elongated shape, wherein the first lifting element and the second lifting element is in each case connected in an articulated manner to the extending unit and to the retractable step and arranged at a distance from one another, wherein the first lifting element is pivotably coupled to the retractable step in an area between the front edge and the rear edge by means of a first joint to the retractable step and is pivotably coupled to the extending unit by means of a second joint, and that the second lifting element is pivotably coupled to the retractable step in an area of the rear edge by means of a third joint and is pivotably coupled to the extending unit by means of a fourth joint, wherein the fourth joint additionally has a translational degree of freedom in horizontal direction, wherein the fourth joint is coupled to the extending motor.

Advantageous further embodiments are in each case specified in the subclaims. All combinations as well as only individual components of the features of the boarding system can thereby be used together. It is furthermore also provided and possible in each case to combine individual or a plurality of features of the boarding system in any way.

According to the disclosure, a boarding system for a passenger transport vehicle comprising a retractable step having lifting and ramp function is proposed, wherein a retractable front edge of the retractable step as well as a rear edge of the retractable step, which is arranged in the rear in the direction of travel, are adjustable in terms of height.

The retractable step or the kick plate, respectively, or the extension, can thereby be horizontally retracted into and extended from a vehicle.

That edge, which is located in the front in the direction of travel, thus facing away from the vehicle, when the retractable step is extended from the vehicle, is to be understood thereby to be a front edge of the retractable step. That edge of the retractable step, which is located in the rear in the direction of travel, when the retractable step is extended, is to be understood thereby to be the rear edge.

In a further embodiment of the boarding system, the retractable step has an extending drive for retracting and extending the retractable step comprising an extending motor and a lifting gear. The lifting gear is thereby equipped to translate an extending movement of the extending motor into an at least partial pivoting movement of the retractable step, so that the pivoting movement of the retractable step causes a change of height of the front edge and/or of the rear edge.

In this context, a general traversing movement of the extending motor is to be understood as extending movement of the extending motor. The described drive and the translation for the pivoting movement of the retractable step are provided to be used in response to an extending as well as in response to a retracting of the retractable step.

When being extended, the retractable step preferably moves from a rest position into a boarding position and, when being retracted, from the boarding position back into the rest position.

In this context, a movement, which at least partially has a rotational portion, is to be considered as "pivoting movement". In this context, a rotational movement about an axis, which projects into the drawing plane—preferably vertically to the extending direction of the retractable step, is to substantially be understood as "pivotable" or "pivoting".

In a further embodiment, the retractable step has an extending unit, to which the retractable step is movably coupled via the lifting gear. The extending movement of the extending motor is thereby at least partially translational.

The lifting gear can furthermore have a lever, which the extending drive moves for translating the extending movement of the extending motor into the pivoting movement of the retractable step. The lever is preferably pivoted.

In a further embodiment of the retractable step, the extending unit is guided in a rail. The extending unit can furthermore have sliding elements, such as for example rollers, for guiding in the rail. The extending unit can furthermore be arranged in a frame or can be arranged on one or two sides of the frame, which are located parallel to the extending direction of the retractable step. It is also possible for this purpose, for example, that provision is made for two extending units, which are guided in parallel.

Provision can furthermore be made for a retractable step drive, which, in addition to a lifting and ramp function, only moves the retractable step out of the vehicle and back into it.

For this purpose, provision can be made for example for drive elements, in particular belt elements, which the extending unit drives in its retracting and extending movement.

Such a retractable step drive can be arranged in a frame. However, it is furthermore possible that a retractable step drive is arranged outside of a frame.

In a further embodiment, an extending drive of the retractable step can have a retractable step drive.

A frame can thereby be embodied as an individual component, so that an entire boarding system can be produced individually. This is advantageous for a simple assembly in a vehicle.

It is furthermore also possible that a frame is embodied integrally in a vehicle or that a vehicle provides an assembly device in the form of a frame for a retractable step.

In a further preferred embodiment, the extending unit can have one or a plurality of side elements on sides of the frame located parallel to the extending direction. Additional rails or guides can be provided, in which sliding elements run. It can simultaneously be ensured through this that the extending unit does not shift or slip from the frame unit. Furthermore, guides can at the same time be used as fastening device of the frame on the vehicle. For example, assembly space for a boarding system can thus be reduced on a vehicle and/or assembly space for a retractable step can be reduced in a boarding system.

In a first alternative of an embodiment, the lifting gear is embodied as a double rocker. The lifting gear as double rocker thereby has a first and a second lifting element, both of which are substantially embodied as elongated components and have an elongated shape. The first and the second lifting element is in each case connected in an articulated manner on opposite ends to the extending unit and to the retractable step. The two lifting elements are thereby arranged at a distance from one another. The first lifting element is pivotably coupled to the retractable step in an area of the retractable step between the front edge and the rear edge by means of a first joint and is pivotably coupled to the extending unit by means of a second joint. The second lifting element is pivotably coupled to the retractable step in an area of the rear edge by means of a third joint and is pivotably coupled to the extending unit by means of a fourth joint. The fourth joint thereby additionally has a translational degree of freedom. This translational degree of freedom is preferably embodied in horizontal direction. The fourth joint and/or the second lifting element can thereby be coupled to the extending motor, so that they can be moved back and forth by means of the extending motor.

It is thereby preferred that the horizontal degree of freedom of the fourth joint is formed by means of a horizontal groove in the extending unit to guide the fourth joint. When the joint is driven, the fourth joint is thereby guided in the groove by means of the extending motor, which moves the joint back and forth in the groove. Due to the fact that the second lifter is coupled to the retractable step so as to be capable of being pivoted, but not horizontally movable, the second lifter compulsorily experiences a pivoting movement as a result of a translational movement of the fourth joint in the groove. The rear edge of the retractable step is forced into a lifting movement in response to the movement of the fourth joint, because the second lifter pushes the retractable step upwards or pulls it downwards.

In a further preferred embodiment of the first alternative, the second joint has a translational degree of freedom in vertical direction. It is preferred thereby that the translational degree of freedom of the second joint is formed by a vertical groove in the extending unit for guiding the second joint.

In a further embodiment of the first alternative, the second joint and/or the first lifter is coupled to the extending motor, so that they can be moved.

In a further embodiment, it is also possible that the second and the fourth joint have a combined translational degree of freedom in horizontal and vertical direction. In addition to the pivotable coupling in the second and fourth joint, it is thereby possible, for example, that these joints are guided on a circular path. It is also possible for this purpose that these joints are guided in a circular or curved groove on the extending unit.

It is furthermore also possible that the second and the fourth joint are guided, for example, in a groove, which runs partially vertically and partially horizontally. It can be attained in this manner, for example, that the extending motor moves the retractable step in a purely translational manner up to a certain point by driving the fourth joint, and that a pivoting movement of the retractable step is then carried out, as soon as the fourth joint is guided differently in its direction of movement.

On principle, both lifting elements can be moved for the at least partially pivoting movement of the retractable step. It is possible to drive the first and/or second lifting element by means of the extending motor.

In addition, the lifting elements in the second and/or fourth joint can be moved in a translational manner via the extending motor.

In a second alternative of an embodiment, the retractable step is rotated about a pivot point, which is fixedly connected to the extending unit. This pivot point is thereby substantially located between the front edge and the rear edge of the retractable step and the axis of rotation of the retractable step about this pivot point is located vertically to the extending direction of the retractable step.

In a further embodiment of the second alternative, the lifting gear has a pivotable coupling of the extending unit and of the retractable step in the area between the front edge and the rear edge. The lifting gear furthermore has a coupling gear, which movably connects the extending unit and the retractable step in the area of the rear edge. The coupling gear of the lifting gear engages with a point or axis of the retractable step, respectively, which is spaced apart from the pivot point, and performs a lifting movement of the rear edge of the retractable step. The rear edge of the retractable step is thus moved. As a result of the pivotable coupling of the retractable step in the area of the pivot point, the opposite front edge of the retractable step moves inevitably. The opposite edges of the retractable step, the front edge and rear edge, thus perform an opposite lifting movement.

The coupling gear is thereby set up to convert a translational movement of the extending unit into a lifting movement of a connecting point of the coupling gear with the retractable step. Such a connecting point of the coupling gear with the retractable step is preferably arranged in the area of the rear edge of the retractable step.

Provision is thereby preferably made for the extending motor to translationally drive the extending unit up to a point, at which the translational movement of the extending unit stops and is converted into the lifting movement of the retractable step by means of the coupling gear. Provision can hereby be made for example for the extending unit to abut a stop in response to its translational movement, driven by the extending motor, whereby the translational driving force of the extending motor is then transmitted to the coupling gear.

In a further embodiment, provision can be made for example for the retractable step drive and the extending drive to have at least the same motor. For example, the extending motor of the extending drive can also drive the retractable step drive.

In a further embodiment, provision can be made for the extending drive to have an electronic control. An electronic control can furthermore have an interface to other control systems of a passenger transport vehicle.

A further embodiment can have a safety switch. A safety switch can be used to interrupt the power supply for a drive of the retracting step in an emergency situation, so that for example an extending is no longer possible. For this purpose, provision can be made for the safety switch to be provided with an actuator, in order to detect an emergency situation. An accident, a jamming or a abutting of the retractable step, e.g., can be understood as emergency situation.

In a further embodiment, provision can be made for the retractable step to have a blockade for the lifting and ramp function.

Such a blockage for a lifting and ramp function of the retractable step can for example be activated only when a rear edge of the retractable step is moved beyond an outer vehicle skin, so that a lifting function is only performed outside of the vehicle.

In a further embodiment, provision can be made for example for the extending motor to drive the extending unit up to a point, at which the translational movement of the extending unit is stopped. Provision can be made, for example, for the extending unit to be stopped by means of a stop, whereby a tilt lever is moved, in turn.

By means of a tilting movement of the tilt lever it can be attained, for example, that a locking of the retractable step is released.

For this purpose, provision can be made for example for a bolt, which blocks a retractable step movement in a non-tilted position of the tilt lever, to be released on the retractable step by tilting the tilt lever.

In a further embodiment, provision can be made for this purpose for a tilt lever to be held by a spring, which tensions in a tilted position of the tilt lever.

For example, the spring can be designed and embodied in such a way that it moves the tilt lever back into its initial position—not tilted.

A locking function can be attained for example in that the bolt is guided in a groove, which runs in a curved manner, on the tilt lever.

Such a groove can for example be embodied in such a way that it prevents a movement of the bolt in the groove in a non-tilted position of the tilt lever.

The groove can furthermore be designed in such a way that the groove and the bolt are moved relative to one another in such a way that, by tilting the tilt lever, the bolt can continue to move in the tilted position of the tilt lever.

It is particularly preferred that the bolt is fastened to the retractable step in such a way that the retractable step cannot be pivoted, as long as the tilt lever is located in a non-tiled position and the retractable step can only move, when the tilt lever moves from this position into a tilted position.

It is furthermore preferred that the bolt is guided in the groove and that bolt and groove move relative to one another when the retractable step is unlocked.

It can thus be attained, for example, that the retractable step is blocked in its movement, as long as the tilt lever is not tilted. It can furthermore be attained through this that the retractable step is released to perform a pivoting movement, when the tilt lever is moved into a tilted position.

In a further preferred embodiment, such a mechanism can be integrated in the lifting gear.

It is particularly preferred thereby that a component of the lifting gear acts as tilt lever, which blocks and can release the movement of a bolt, which follows the retractable step.

Provision can be made for example for a groove for guiding a bolt, which is fastened to the retractable step, to be integrated for example in a first and/or second lifter.

Provision can furthermore be made for example for a bolt, which his fastened to the retractable step, to be guided in a groove, which is provided on a first element of the coupling gear. It is particularly preferred, for example, that such a guide groove is embodied in a curved manner.

Provision can furthermore be made for a drive of the retractable step to be equipped with a brake, which keeps the entire retractable step from extending in the case of a lack of electricity.

Provision can furthermore be made for the extending unit to have reinforcing elements, which reinforce the extending unit on the one hand, but which also ensure an improved synchronization, when at least two, or also a plurality of extending units, which are arranged parallel to one another, are provided on a retractable step.

Provision can be made in a further embodiment for the retractable step to have a locking device. Such a locking device can preferably be operated manually. The retractable step can be locked for example in different positions and tilts, for example for maintenance or cleaning operations, by means of the locking device. Provision can be made thereby for this locking device to only be activated if needed, and can otherwise be stowed such that it is not in the way.

Provision can furthermore be made for a seal to be provided on the retractable step. A seal can for example be provided on a front edge. A seal is preferably embodied in the form a rubber lip, in order to protect the interior of the vehicle against the ingress of moisture and/or dirt, when the retractable step is retracted.

BRIEF DESCRIPTION OF THE DRAWINGS

Further advantageous embodiments and further developments are specified in the following figures. The respective features following therefrom, however, are not limited to individual figures or embodiments. In fact, one or a plurality of features of the above description can additionally be combined with individual or a plurality of features of the figures to form further developments.

DETAILED DESCRIPTION OF THE DRAWINGS

Figures 1, 7:
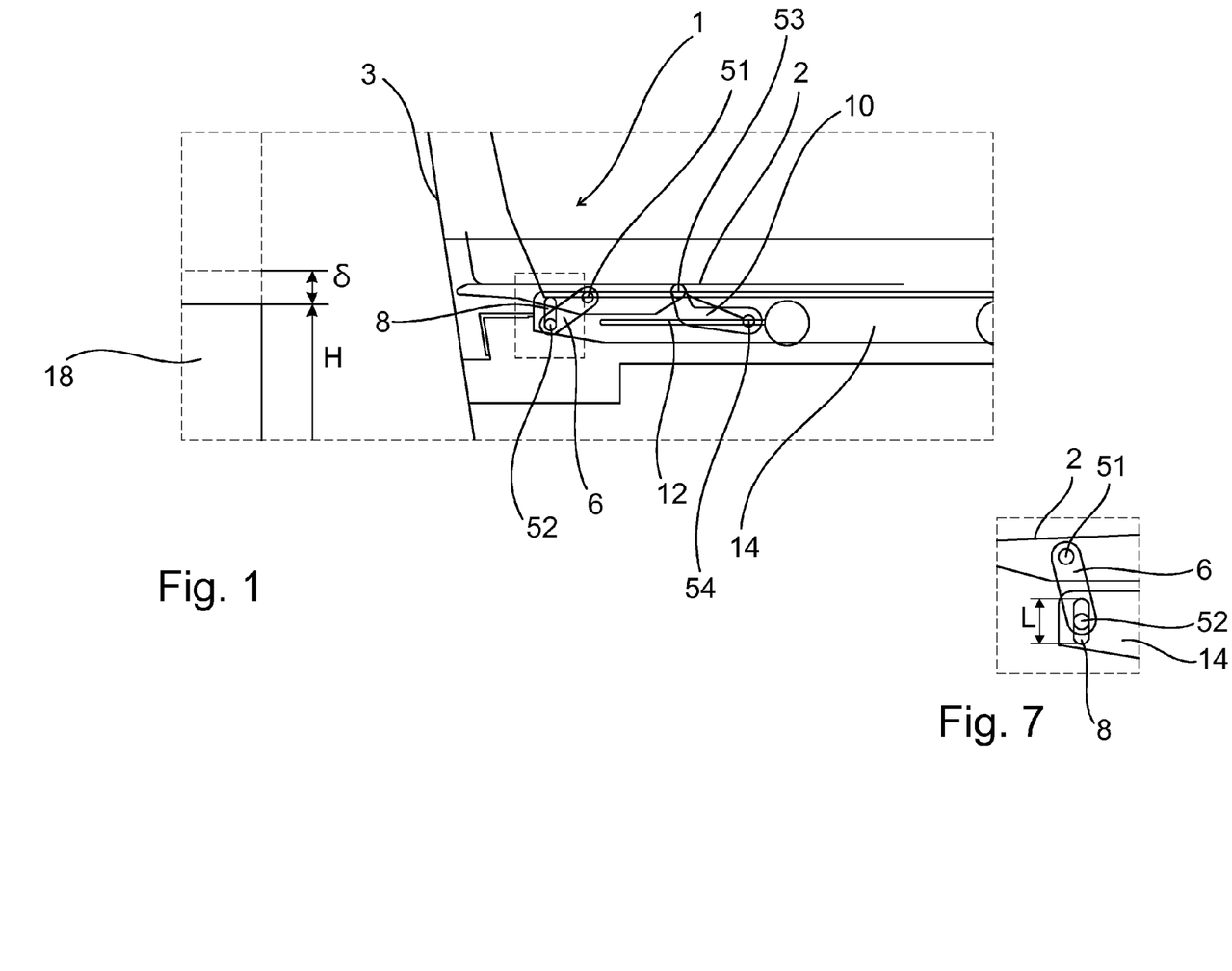
FIGS. 1 to 7 show a retractable step of the first alternative.

A boarding system 1, which has a retractable step 2, which is guided in a vehicle 3 and which can be retracted and extended, follows from FIG. 1. The boarding system 1 comprises an extending unit 14, which is supported in side supports so as to be capable of being retracted and extended. The extending unit 14 is preferably guided in two parallel side supports, and thus provides a good stability for retracting and extending the retractable step 2. The retractable step 2 is supported on the extending unit 14 by means of a first lifting element 6, which will hereinafter also be identified as lifting-pivoting arm. The lifting-pivoting arm 6 is supported on the extending unit 14 as well as on the retractable step 2 by means of a first and a second rotary joint 51, 52. In addition, the second joint 52 on the extending unit 14 also has a translational degree of freedom in vertical direction. For this purpose, the second joint 52 is supported in the ramp lift slit 8, which is embodied as groove.

The retractable step 2 of the retractable step 1 is furthermore connected to the extending unit 14 via a second lifting element 10, which will be identified below as steering and end lifting angle. The second lifting element is pivotably connected to the rear edge of the retractable step 2 in the third joint 53 on the one hand and the second lifting element 10 is pivotably connected to the extending unit 14 in the fourth joint 54 and in a horizontal groove 12 on the other hand.

It follows from this arrangement that the retractable step 2 is connected to the extending unit 14 via the first and second lifting element 6, 10 to the extending unit 14 in such a way that the two lifting elements 6, 10 are guided in the joints 52, 54 in the grooves 8, 12.

By means of a translational movement of the second lifting element 10 in the fourth joint 54, the front edge and the rear edge of the retractable step 2 can thus perform lifting movements. It is furthermore possible thereby to set up the retractable step as ramp.

By means of a translational movement of the lifting element 10 in the fourth joint 54 in groove 12, the lifting element 10 is rotated and set up, whereby it pushes the retractable step 2 on the connecting point in the third joint upwards or pulls it downwards. The lifting element 10 thereby acts as lever.

A retractable step guide is thereby arranged in such a way that the first and second lifting element 6, 10 are pivotably coupled to the retractable step and that the first lifting element 6 is connected to the extending unit so as to be rotatable and additionally so as to be movable in a translational manner in vertical direction. The second lifting element 10 is coupled to the extending unit 14 so as to be rotatable and movable in a translational manner in vertical direction.

A platform 18, which has a platform height H, is furthermore illustrated schematically in FIG. 1. In practice, it is necessary for the retractable step 2 to bridge the gap between the platform 18 and the vehicle 3. In practice, a platform height varies thereby by different values. A variation value for a platform height is specified schematically here with the value δ

Figure 2:
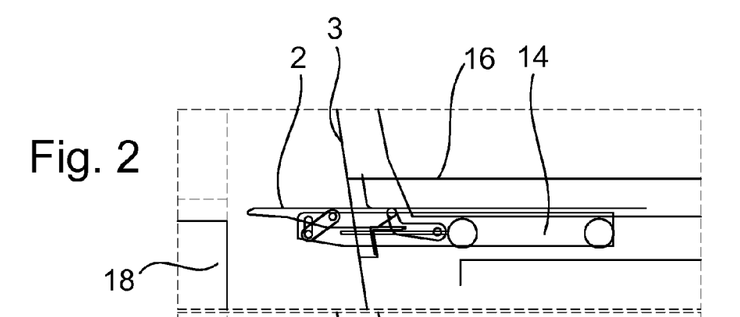

For a retractable step function, the extending unit 14 can be moved in a translational manner in horizontal direction, as illustrated in FIG. 2, so that the retractable step 2 is moved out of the vehicle.

Figure 3:
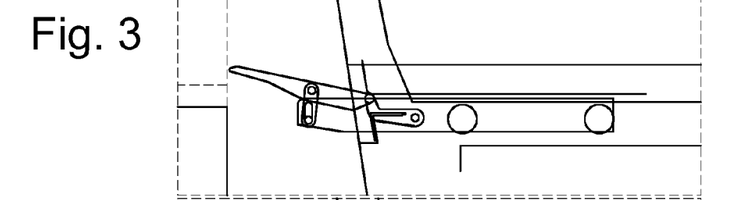

A possibly type of a travel for a retractable step 2 thereby follows from FIGS. 2 to 5, whereby said retractable step is initially supported in a retracted rest position, as illustrated in FIG. 1, and is then extended out of the vehicle 3 from this retracted position into an extended position, as illustrated in FIG. 2. The extending thereby represents merely a translational movement of the retractable step 2. FIG. 2 thus illustrates an initial position, from which the retractable step 2 can be used as a ramp. A lifting phase is illustrated in FIG. 3, wherein the front edge of the retraceable step is lifted by raising the first lifting element 6. For this purpose, the first lifting element 6 is moved by an extending motor, whereby the extending motor is not illustrated.

In addition to or separately from the movement of the first lifting element, the second lifting element 10 can be moved in a translational manner in the fourth joint 54 by means of an extending motor (not illustrated). The arrangement of the first and second lifting element 6, 10 on the retractable step 2 and the extending unit 14 acts as a lifting gear for translating the translational movement of the fourth and/or of the second joint 52, 54 into an at least partially rotational movement of the retractable step, so that the rear and/or front edge of the retractable step perform a lifting movement.

Figure 4:
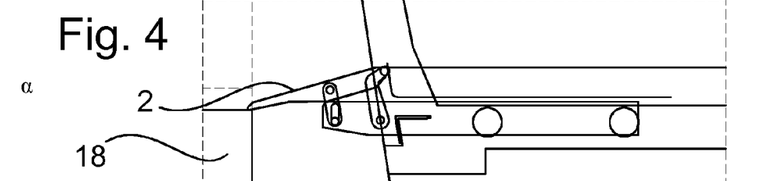

It is further illustrated in FIG. 4, how the front edge of the retractable step 2 can be brought to rest on a platform 18. The front edge of the retractable step 2 is thereby initially lifted onto and brought to rest on the platform 18. The first lifting element 6 thereby adapts to the position of the retractable step 2. The second lifting element 10, end lifting angle, is thereby guided into a position, in which the rear end of the retractable step is lifted and stabilized.

Figure 5:
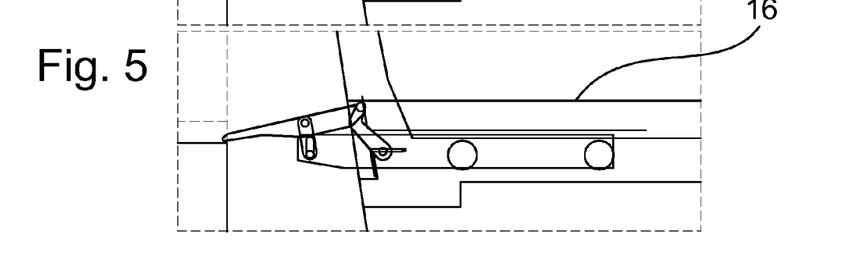

As can be seen in FIG. 5, the rear edge of the retractable step is thereby raised to the same level with the vehicle bottom 16.

Figure 6:
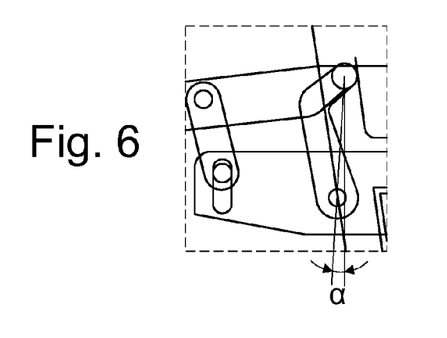

The second lifting element 10 is stabilized in that it is moved in its position across a dead center angle α. The dead center angle α is thereby illustrated in FIG. 6.

The first lifting element 6, the retractable step 2 and the extending unit 14 is illustrated in FIG. 7 in an enlarged manner. It follows from this enlargement that the lifting-pivoting arm 6 is pivotably connecting to the retractable step 2 via the second joint 52 and is furthermore coupled to the extending unit 14 in groove 8 so as to be capable of being vertically displaced. The translational movement of the ramp lift slit 8 is thereby limited to the length L.

For the at least partially pivoting movement of the retractable step, the second and/or fourth joint can be moved or driven, respectively, in a translational manner by means of the extending motor.

Figure 8:
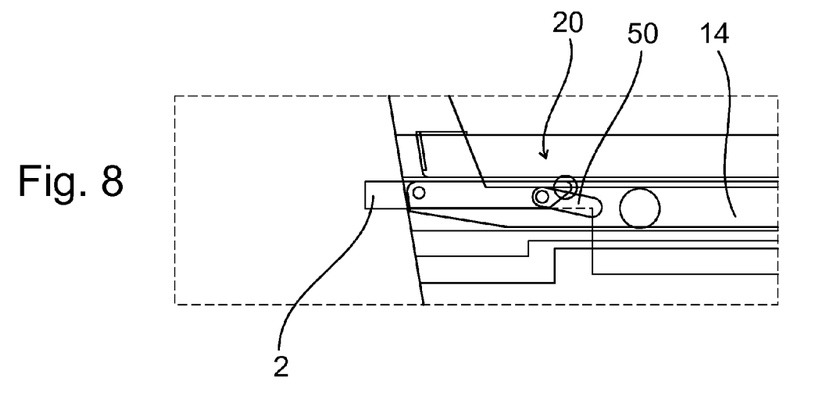
FIGS. 8 to 10 show a further alternative of a retractable step.
Figure 9:
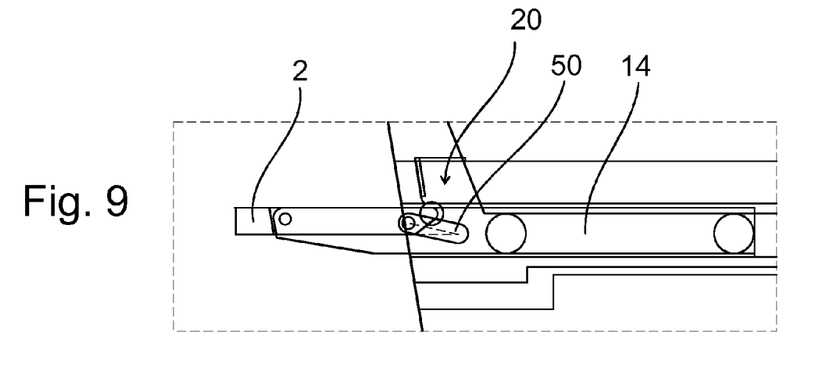
Figure 10:
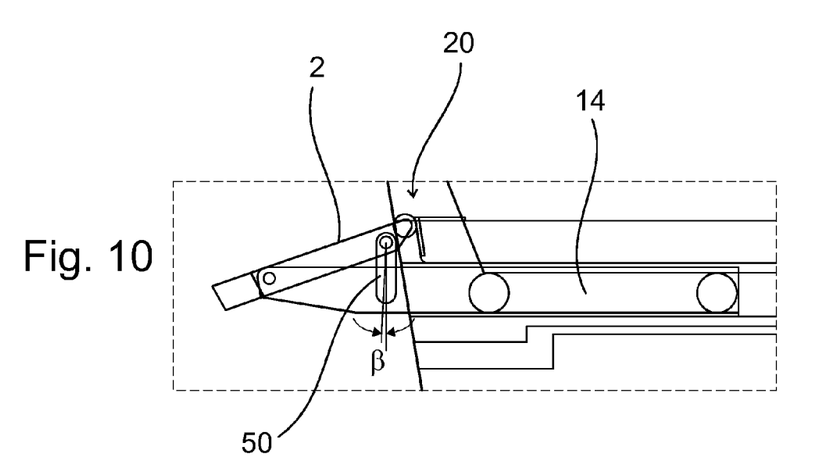
Figure 11:
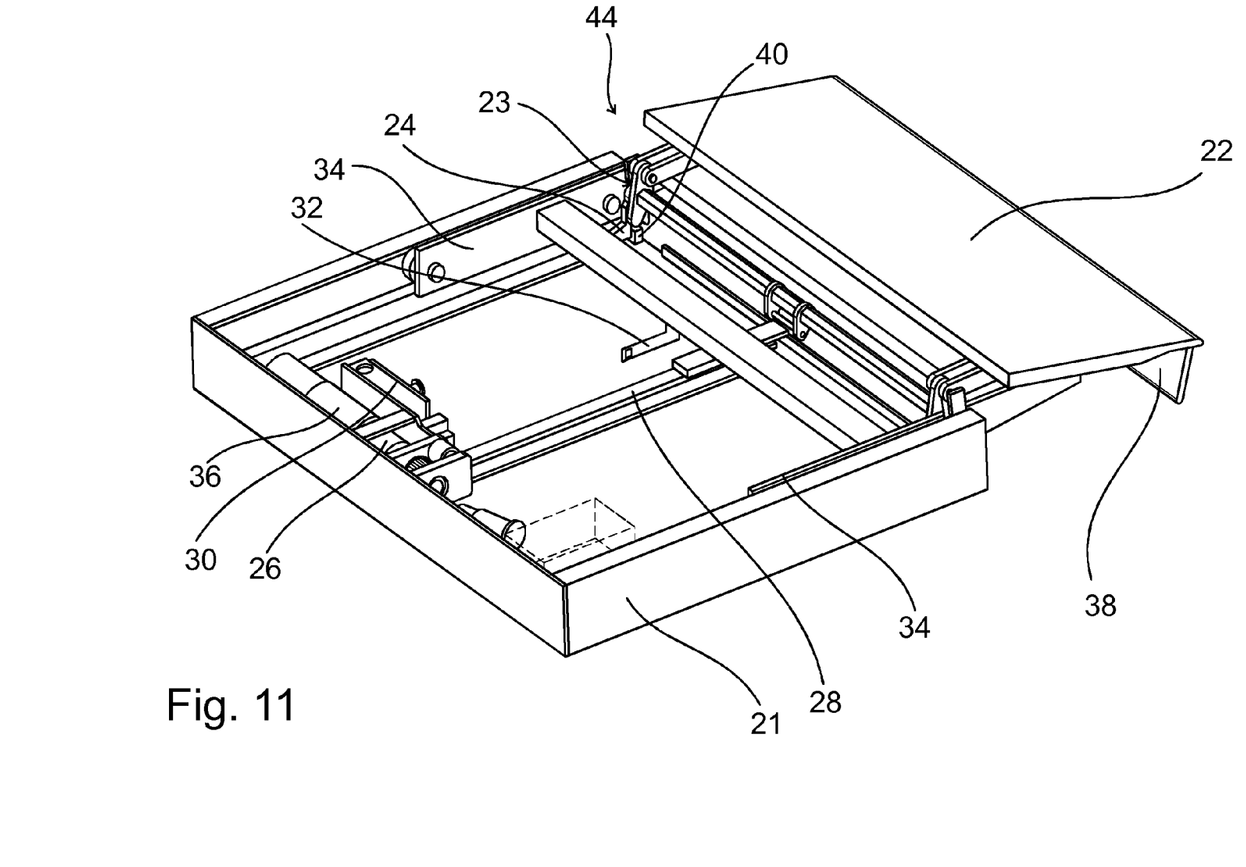
FIGS. 11 to 14 show a retractable step of the second alternative.

A further alternative of a boarding system 20 having a lifting and ramp function follows from FIGS. 8 to 10. In this alternative, the retractable step 2 is thereby pivotably connected to the extending unit 14 on the front edge. The retractable step 2 is furthermore connected to the extending unit 14 via an individual lifter 50 in such a way that this individual lifter 50 is pivotably supported on the retractable step 2 on the one hand and is supported on the extending unit 14 in a pivotable as well as horizontally translational manner on the other hand, so that the retractable step 2 can be tilted about the axis of the pivot joint on the retractable step 2. The individual lifter 50 thereby positions itself between the retractable step 2 and extending unit 14 and moves in a translational manner in a groove in the area of the pivot joint on the extending unit 14, whereby the groove is not illustrated in FIGS. 8-10, but only the translational movement. The individual lifter 50 is preferably moved by means of a motor (not illustrated).

A boarding system 20 in a retracted position thereby follows from FIG. 8. An extended boarding system 20 follows from FIG. 9, in which a lifting ramp function of the retractable step, however, does not take effect yet.

FIG. 10 thereby illustrates a boarding system 20 in an extended position comprising an end lifting and lowering of the front edge of the retractable step 2. The retractable step 2 can furthermore be locked in that the lifter 50 is moved beyond a dead center with the locking angle β.

A boarding system 44, in the case of which a retractable step 22 is coupled to two extending units 34 located opposite one another, follows from FIGS. 11 to 14. The extending units 34 are thereby supported in a frame 21. A coupling gear 23, which is equipped to move the rear edge of the retractable step 22 upwards or downwards, thus to perform a lifting function of the rear edge of the retractable step 22, is arranged between the extending units 34 and the retractable step 22. The coupling gear 23 is thereby arranged between the retractable step 22 and the extending unit 34 in such a way that a translation of a translational movement takes place, which drives the extending units, when a first element of the coupling gear strikes against a stop 40, which is arranged on the frame side. When the extending unit 34 is moved further on the stop 40, at least one component of the coupling gear 23 acts as lever. The rear edge of the retractable step is lifted via the translation of the coupling gear 23.

It is particularly preferred that two extending units, which run parallel, are arranged in a frame element. They can optionally be connected to one another for reinforcing purposes. Provision can then furthermore be made for both extending units 34 to be arranged on the retractable step 22 in parallel and opposite one another via coupling gear 23. Provision can thereby furthermore be made for two stops to also be provided on both opposite parallel frame sides, in which the extending units are guided. Coupling gears 23 arranged in parallel on the retractable step 22 can furthermore also have a reinforcement. The reinforcements can connect the same components of the coupling gears 23 to one another. Reinforcements can also be provided between extending units 34, which are guided in parallel.

Provision is made in this embodiment for an electric motor 26 to drive the extending units 34 via a toothed belt 28. The boarding system 44 illustrated in FIG. 11 further has a safety switch 30, a safety actuator 32, wherein the safety actuator 32 can trigger the safety switch 30 in a dangerous situation. Provision is further made for an electronic control box 36 for connecting the control of the drive to a control of a vehicle, in which a boarding system is installed. To seal the retractable step 22 of the boarding system 44 with a vehicle portal, provision is made on the front edge of the retractable step 22 for a rubber seal in the form of a lip 38.

Figure 12:
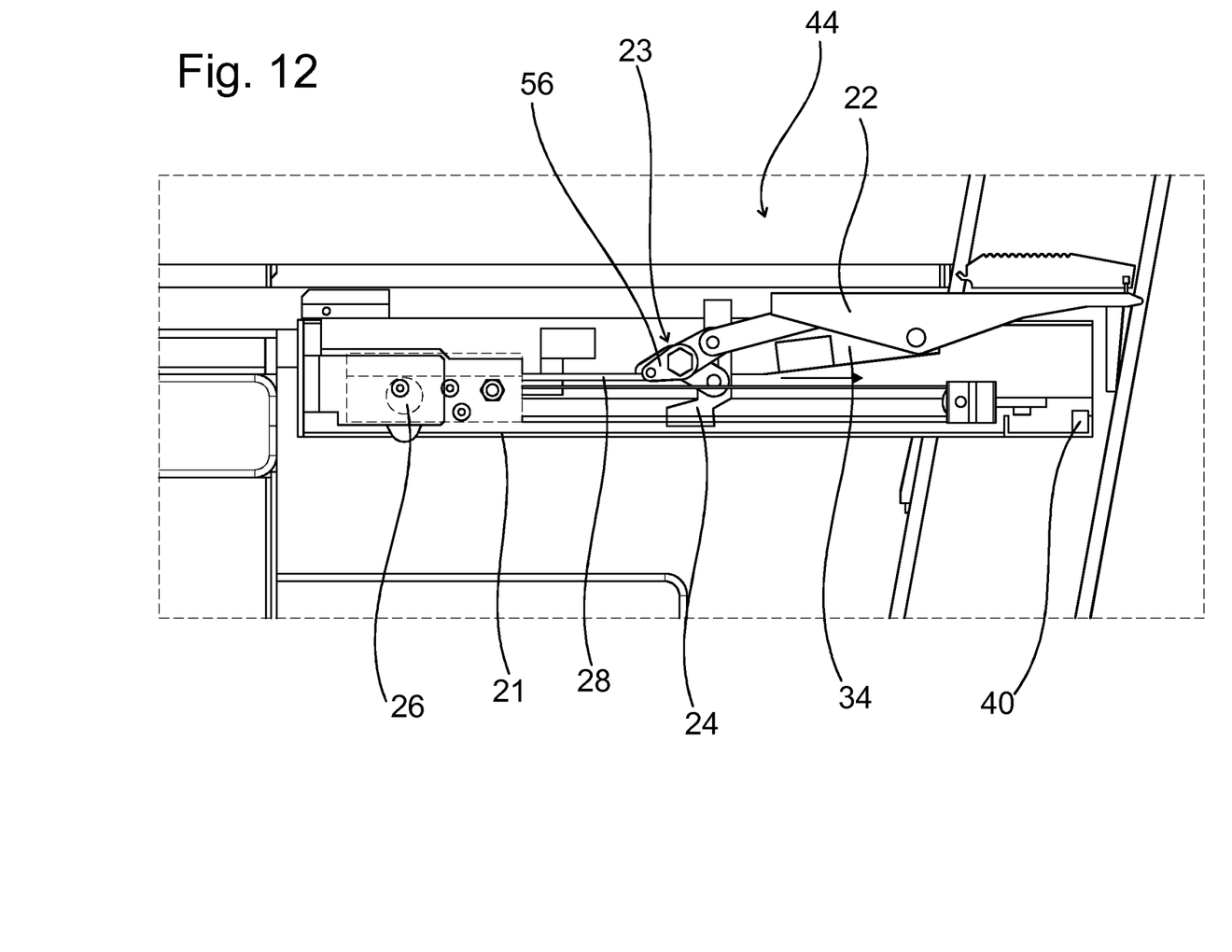

FIG. 12 shows the boarding system 44 in a sectional illustration. The extending unit 34 is supported so as to slide in the frame 21. A motor 26 thereby drives the extending unit 34 via a toothed belt 28 in a translational manner in the direction of the arrow. The extending unit 34 and the retractable step 22 are thereby coupled to one another via the coupling gear 23. If the extending unit 34 is now pushed across the drive in the direction of the arrow, a first element of the coupling gear 24 abuts a stop 40. When the extending unit 34 is moved further, the first element of the coupling gear tilts and an extending force additionally acts on the component 56 of the coupling gear 23, so that the latter is moved as a lever and introduces the extending force or the extending movement, respectively, into the coupling gear.

Figure 13:
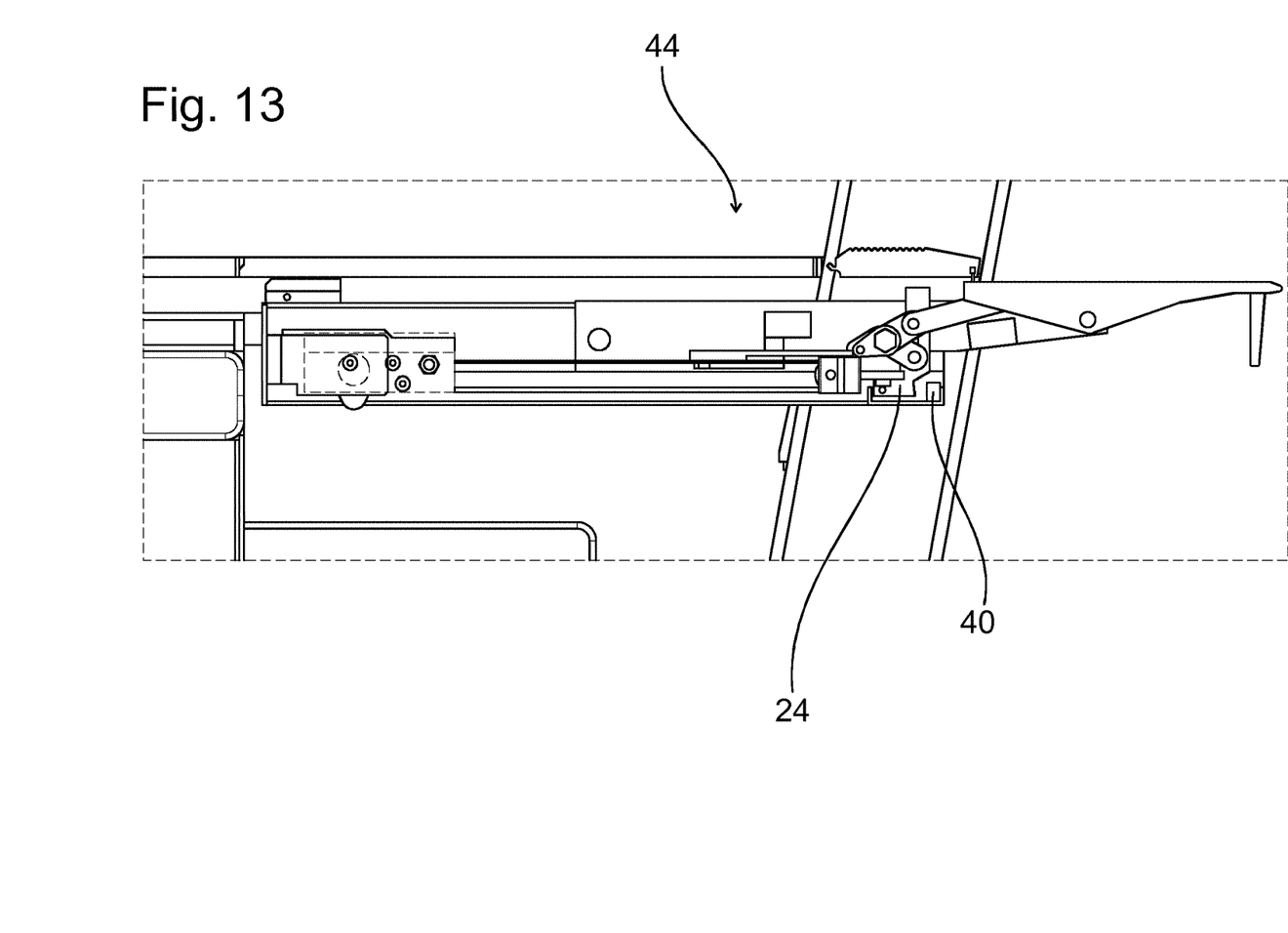

An illustration of a motion sequence of the boarding system 44 in a position, which is extended father than in FIG. 12, is illustrated in FIG. 13. In this sequence, the first element of the coupling gear 24 is just before coming in contact with the stop 40.

Figure 14:
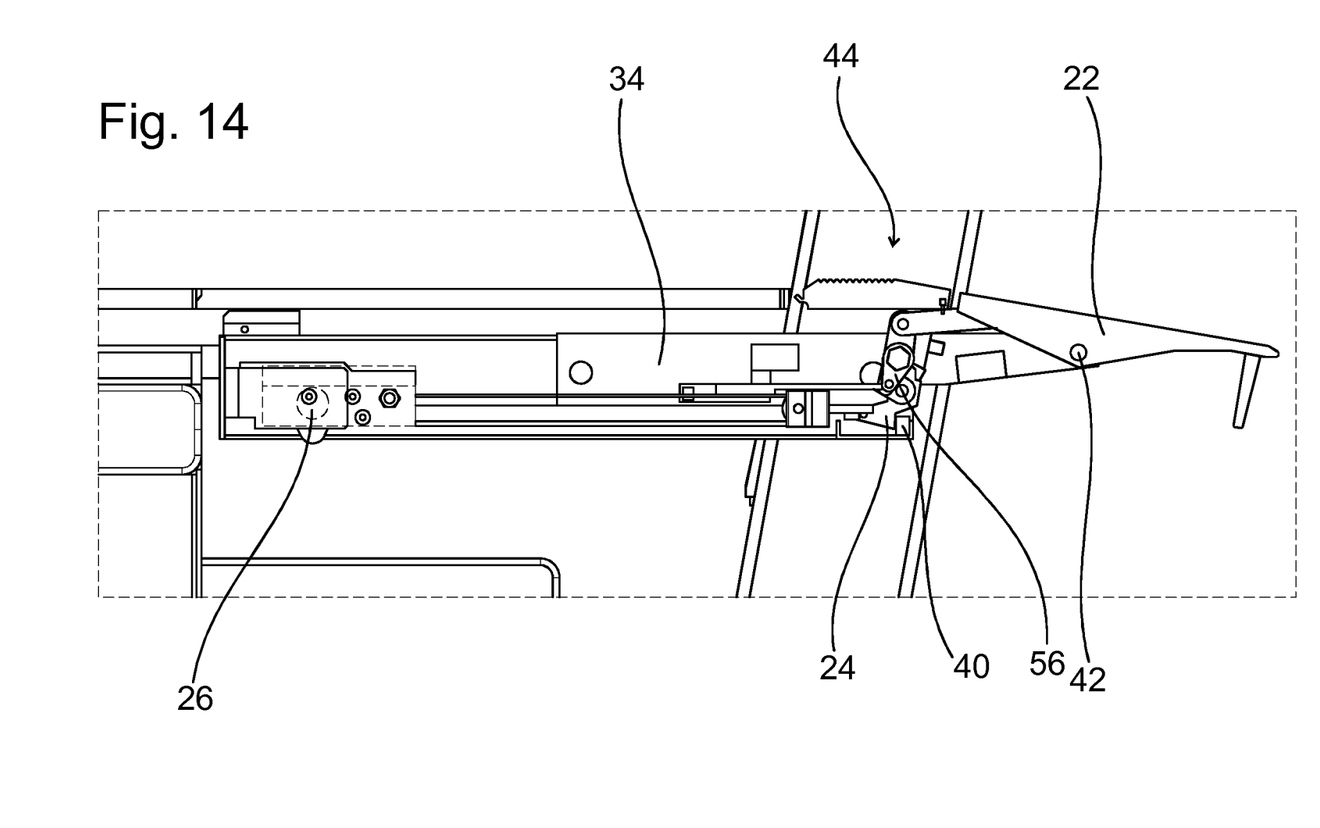

A further motion sequence, in the case of which the first element of the coupling gear 24 has come into contact with the stop 40, and the motor 26 has further moved the extending unit 34, follows from FIG. 14. The component 56 of the coupling gear 23 has been moved as lever, so that the coupling gear 23 translates the translational movement to the rear end of the retractable step 22 as lifting movement and the retractable step 22 is lifted.

Provision is furthermore made in this embodiment of the boarding system 44 for the retractable step 22 to not only be connected to the extending unit 34 via the coupling gear 23, but also by means of a further joint 42, which pivotably connects the retractable step 22 to the extending unit 34. The retractable step can thereby be rotated about an axis vertically to the extending direction. Illustrated here as axis, which projects into the drawing plane. As a result of this coupling of the retractable step 22 to the extending unit 34, the retractable step 22 performs a corresponding lowering with the front edge in response to lifting the rear edge. The retractable step thus performs a lifting as well as a lowering function 23.

It is furthermore also conceivable and possible to arrange a coupling gear and/or a stop in such a way that the retractable step 22 performs a lowering in the rear area and thus experiences a lifting with the front edge in the front area. The retractable step 22 is preferably constructed in such a way that the pivoting movement reverses accordingly when retracting the retractable step 22.

Figure 15:
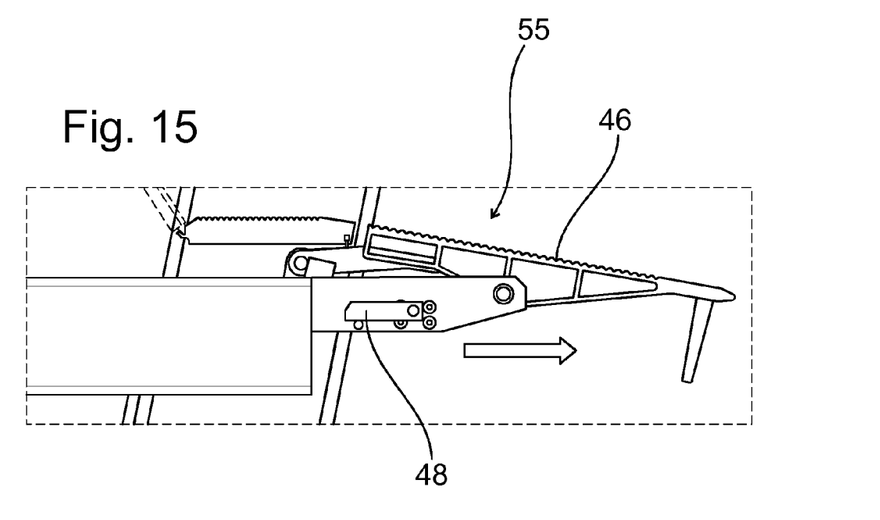
FIGS. 15 and 16 show a further embodiment of a retractable step comprising a parking brake.
Figure 16:
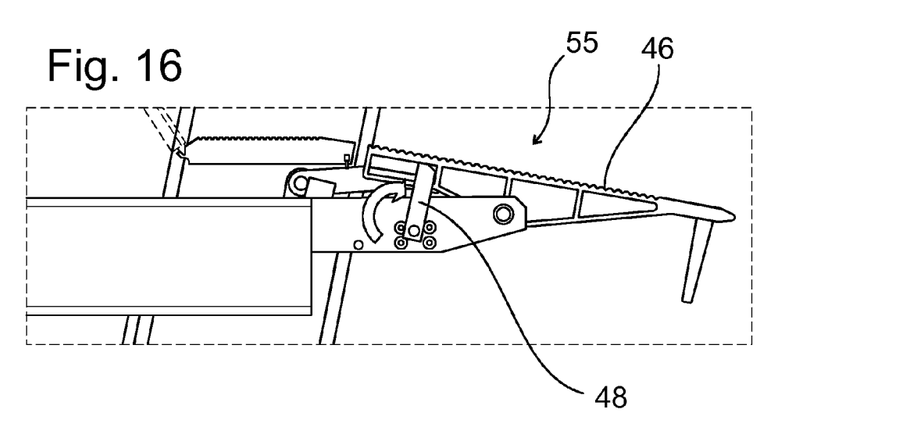

A further boarding system 55, in the case of which a manual locking 48 of the retractable step 46 is provided, follows from FIGS. 15 and 16. Apart from the lifting and lowering function, which is transferred to the retractable step via the coupling gear by means of the extending movement, it is thus also possible to lock the retractable step 46 in a ramp position, for example for maintenance or repair operations. The manual locking 48 is constructed in such a way here that it is not carried out automatically, but by hand. However, provision can furthermore also be made and it can be possible for a locking to be activated automatically or electronically, for example.

Figure 17:
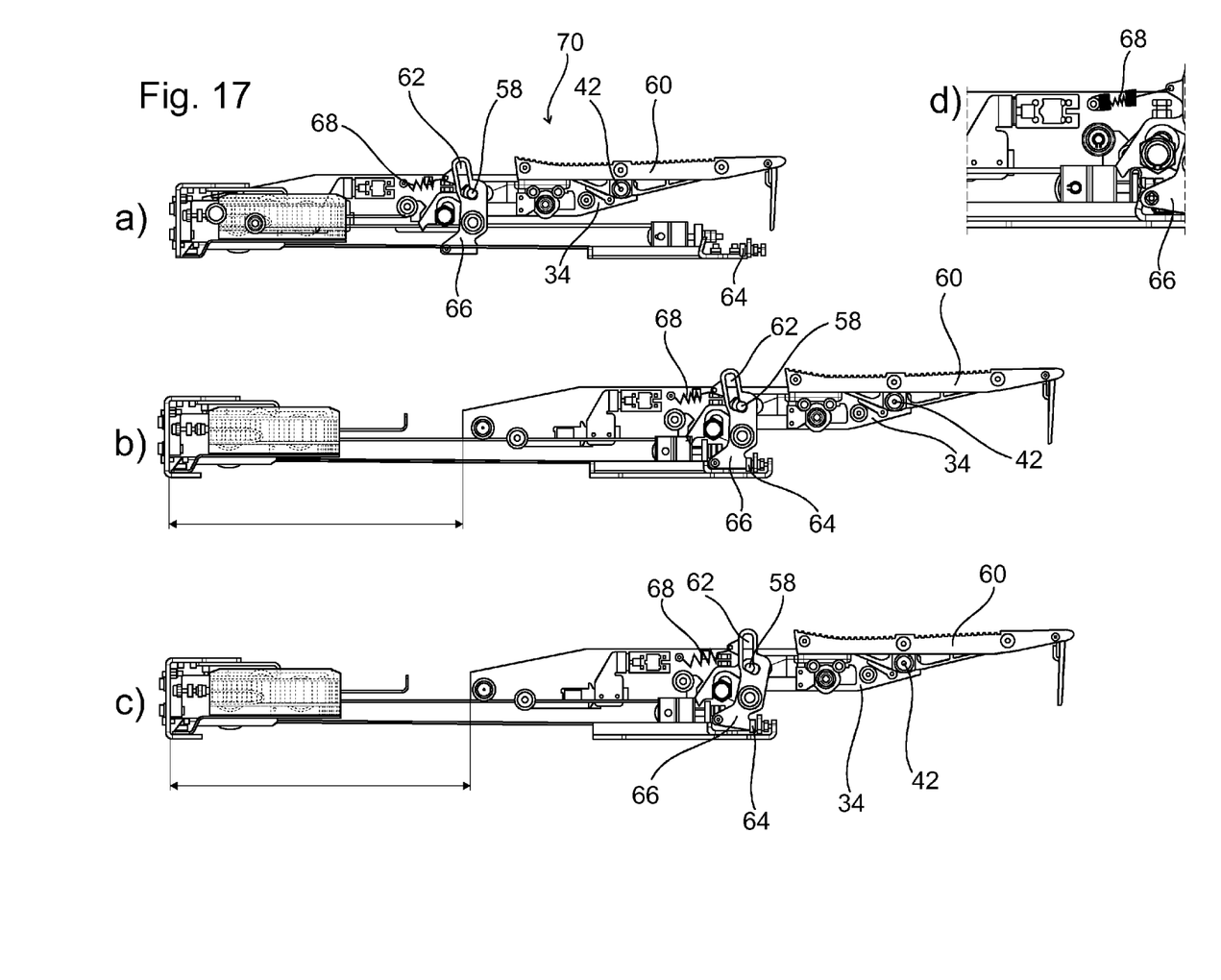
FIG. 17 shows a retractable step comprising an unlocking mechanism.

FIG. 17 illustrates a boarding system 70 comprising a retractable step 60. The retractable step 60 has a lifting and ramp function, wherein it can be retracted and extended and tilted. The tilting of the retractable step 60 can thereby be locked and unlocked. For this purpose, the retractable step 60 has a bolt 58, which is guided in a curved groove 62 in a tilt lever 66. In the case of a travel of the retractable step, which is illustrated via FIGS. 17a to 17c, the tilt lever abuts a stop 64 at the end of the travel, as a result of which the tilt lever 66 is tilted. The bolt 58 is moved relative to the groove 62 by means of the tilt movement of the tilt lever 66.

In a non-tilted position of the tilt lever 66, as illustrated in FIG. 17a, the bolt 58 cannot be moved vertically, in order to rotate the retractable step 60 about the joint 42. By means of a movement of the tilt lever relative to the bolt 58, the groove 62 is moved relative to the bolt 58 in such a way that the latter can move in horizontal direction in the groove 62 and that a horizontal movement of the rear edge of the retractable step 60 is possible. The retractable step 60 can thus be pivoted about the joint 42. By pivoting the retractable step 60 about the joint 42, said retractable step can perform a lifting and ramp function, wherein the rear edge and the front edge of the retractable step 60 change in terms of their height.

In addition, provision is made on the boarding system 70 for a spring 68, which connects the tilt lever 66 and the extending unit 34. The spring is relaxed, when the tilt lever 66 is located in a non-tilted position, as in FIGS. 17*a* and 17*b*. The spring is tensioned, as soon as the tilt lever 66 abuts the stop 64 and is thus tilted, as can be seen in FIGS. 17*c* and *d*. The spring force counteracts the tilt movement, so that the tilt lever 66 is pulled into the non-tilted position, as soon as the tilt lever 66 is no longer pressed against the stop 64.

A safety function can be provided in this manner in that a possible tilt movement of the retractable step 60 is blocked, when the tilt lever 66 is not tilted. Such a safety function can be provided for example during operation as a locking and unlocking for a lifting and ramp function of the retractable step 60. For example, a lifting and ramp function of the retractable step 60 can only be activated, when a rear edge of the retractable step is moved beyond an outer vehicle skin, so that a lifting and ramp function is only performed outside of the vehicle, and not within an insertion in the vehicle.

It can thus be avoided, for example, that malfunctions result, and that the retractable step is damaged or jams in the vehicle, for example.

The invention claimed is:

1. A boarding system for a passenger transport vehicle, the boarding system comprising:
   a retractable step having a lifting and ramp function, wherein an extendable front edge of the retractable step and a rear edge of the retractable step which is arranged in the rear in the direction of travel, are adjustable in terms of height,
   an extending drive for retracting and extending the retractable step, wherein the extending drive has an extending motor and a lifting gear, wherein the lifting gear translates an extending movement of the extending motor into an at least partial pivoting movement of the retractable step, so that the pivoting movement of the retractable step causes a change of height of the front edge and/or of the rear edge, and
   an extending unit, with which the retractable step is movably coupled via the lifting gear,
   wherein the lifting gear has a first lifting element and a second lifting element, which has a substantially elongated shape, wherein the first lifting element and the second lifting element is in each case connected in an articulated manner to the extending unit and to the retractable step and arranged at a distance from one another, wherein the first lifting element is pivotably coupled to the retractable step in an area between the front edge and the rear edge by means of a first joint to the retractable step and is pivotably coupled to the extending unit by means of a second joint, and that the second lifting element is pivotably coupled to the retractable step in an area of the rear edge by means of a third joint and is pivotably coupled to the extending unit by means of a fourth joint, wherein the fourth joint additionally has a translational degree of freedom in horizontal direction, wherein the fourth joint is coupled to the extending motor.

2. The boarding system according to claim 1, wherein the extending movement of the extending motor is at least partially translational.

3. The boarding system according to claim 1, wherein the lifting gear has a lever, which the extending drive moves for translating the extending movement into the pivoting movement of the retractable step.

4. The boarding system according to claim 1, wherein the horizontal degree of freedom of the fourth joint is formed by a horizontal groove in the extending unit to guide the fourth joint.

5. The boarding system according to claim 1, wherein the second joint has a translational degree of freedom in vertical direction.

6. The boarding system according to claim 5, wherein the translational degree of freedom of the second joint is formed by a vertical groove in the extending unit to guide the second joint.

7. The boarding system according to claim 1, wherein the extending drive has an electronic control.

8. The boarding system according to claim 1, further including a safety switch.

9. The boarding system according to claim 1, further including a locking device for the retractable step.

10. The boarding system according to claim 9, wherein the locking device is operated manually.

\* \* \* \* \*